United States Patent [19]

Wilber

[11] 3,871,020

[45] Mar. 11, 1975

[54] CHROMINANCE SIGNAL CORRECTION

[75] Inventor: James Albert Wilber, Indianapolis, Ind.

[73] Assignee: RCA Corporation, New York, N.Y.

[22] Filed: May 7, 1973

[21] Appl. No.: 357,564

[52] U.S. Cl. .................................................. 358/8

[51] Int. Cl. ........................ H04n 9/02, H04n 5/76

[58] Field of Search ...... 178/5.4 R, 5.4 CD, 5.4 SY; 358/8

[56] References Cited

UNITED STATES PATENTS

| | | | |
|---|---|---|---|
| 3,629,491 | 12/1971 | Dann et al. | 178/5.4 CD |
| 3,697,673 | 10/1972 | Dann | 178/5.4 CD |
| 3,757,034 | 9/1973 | Fujita | 178/5.4 CD |

*Primary Examiner*—Richard Murray
*Attorney, Agent, or Firm*—E. M. Whitacre; William H. Meagher

[57] ABSTRACT

In a video disc player, a recorded composite signal, recovered during disc playback, includes a chrominance signal component buried in the midband of the accompanying luminance signal component. The player includes video processing circuits converting the recovered signal to an output composite signal in which the chrominance signal component occupies a higher frequency band, and employing the step of heterodyning the recovered composite signal with oscillations at a nominal frequency of $f_s + f_s'$ (where $f_s$ is the color subcarrier frequency of the output, and $f_s'$ is the buried color subcarrier frequency of the disc signal). To stabilize the output chrominance signal component against spurious frequency variations accompanying disc playback, a phase locked loop (PLL) system is established to cause the $f_s + f_s'$ oscillations to track the disc frequency variations. The PLL system employs a voltage controlled oscillator (VCO) operating at a nominal frequency of $\frac{1}{2} f_s - f_s'$, and responding to the output of a phase detector, comparing the synchronizing burst component of the output chrominance signal with the highly stable output of a reference oscillator operating at $f_s$. The VCO output is heterodyned with oscillations at $3/2\, f_s$, derived from the reference oscillator, to provide the desired oscillation output varying about $f_s + f_s'$. "Sidelock" under disc playback initiation conditions is avoided by limiting the hold-in range of the VCO. A sweep voltage input to the VCO is supplied under out-of-lock conditions to enable phase lock acquisition. Upon achievement of phase lock, sweep generation is disabled, and sweep voltage sweeps back to mid-range value with normal slope. Sample-and-hold circuitry is employed in error voltage development, to enable PLL system to hold within rapid pull-in range during lengthy signal dropouts.

8 Claims, 5 Drawing Figures

CHROMINANCE SIGNAL CORRECTION

Figure 1:
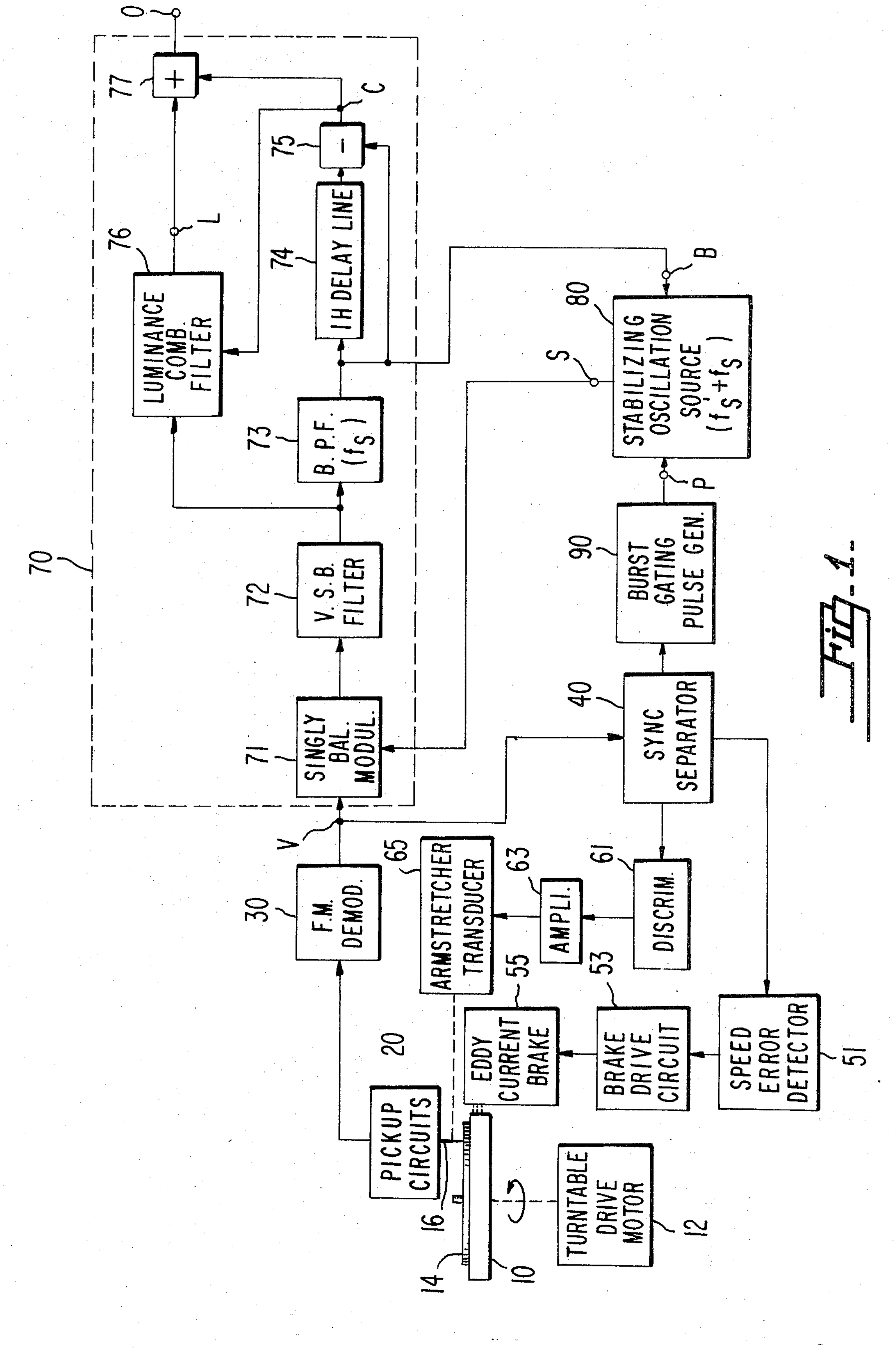

The present invention relates generally to chrominance signal correction techniques and apparatus therefor, and particularly to such techniques and apparatus suitable for use in correcting frequency jitter of chrominance signal components of composite video signals developed upon playback of a video disc record.

In U.S. Pat. No. 3,711,641, issued to Richard C. Palmer on Jan. 16, 1973, a video disc player system is described in which a capacitance varies in value with information recorded on a video disc, the variations altering the response of a resonant circuit (incorporating the capacitance) to an injected fixed frequency RF signal. A peak detector detects the resultant amplitude variations of the RF signal to recover the recorded information. Illustratively, the variable capacitance is, as described in copending U.S. Pat. application Ser. No. 126,772, filed Mar. 22, 1971 for Jon K. Clemens, the capacitance exhibited between a conductive electrode surface on a pickup stylus and a conductive surface of the disc, the capacitance varying, as the disc is rotated, in accordance with geometry variations in the bottoom of the disc groove representative of the recorded information.

It will be appreciated that errors in the relative velocity between pickup stylus and disc groove during disc playback can result in spurious variations in the frequencies of the recovered signal components. One manner of reducing such errors is to employ a speed correction system involving adjustment of the rotational speed of the disc-supporting turntable in an error-compensating direction. Illustrative of such a rotational speed adjusting system is the speed control system described in copending U.S. Pat. application Ser. No. 284,510, filed on Aug. 29, 1972 for Billy W. Beyers, Jr.

Another manner of reducing such errors involves corrective adjustment of the positioning of pickup stylus and is described in the aforesaid Palmer patent (U.S. Pat. No. 3,711,641). The system of the Palmer patent includes detection means for detecting the velocity of the record groove relative to the pickup means. Circuit means are coupled to the detection means to develop an error signal when the detected velocity differs from a desired velocity. Electromechanical transducing means are mechanically coupled to the signal pickup means and electrically coupled to the circuit means. The transducing means is responsive to the error signals from the circuit means to vary the position of the signal pickup means along the disc groove in a manner to hold the relative velocity between the pickup means and the record groove substantially at the desired velocity. A system of the type described in the Palmer patent is herein referred to as an "armstretcher" system in that the velocity error correcting technique employed effectively serves to variably stretch the pickup arm in the disc player.

In operation of video disc players of the variable capacitance type disclosed in the aforesaid Clemens application, it has proved desirable to employ a combination of the above described velocity error correction techniques, i.e., to employ a turntable speed control system to stabilize average velocity supplemented by an armstretcher system to overcome particularly bothersome cyclical velocity variations. In an illustrative player employing such a combination, a turntable speed control system of the type disclosed in the aforesaid Beyers application utilizes an eddy current brake to controllably reduce the turntable rotational speed from a free-running speed chosen to be normally above the desired operating speed. In operation, the controllable braking system reliably holds the average stylus-groove velocity within ±0.1% of the desired velocity for a given groove diameter. When the controllable braking system action is then supplemented by operation of the armstretcher system, cyclical variations of the relative stylus-groove velocity at the once-around frequency (e.g., 7.5 Hz.) and harmonics thereof may be held within similar tolerances.

While the aforesaid velocity error correcting combination is thus capable of correcting frequency jitter of the recovered signal components to a degree sufficient to reasonably ensure, for example, the ability to effect horizontal deflection synchronization in a typical commercial color television receiver (to which the recovered signals may ultimately be applied), it has proved desirable to provide further stabilization against jitter effects for the chrominance signal components of a recorded composite color television signal.

In copending U.S. application Ser. No. 351,036, filed Apr. 13, 1973 for John G. Amery, et al., player apparatus is disclosed for processing a composite color video signal recovered during playback of a video disc, the composite signal having been encoded per a format wherein a chrominance signal in the form of a modulated subcarrier is buried in spectrum troughs in the midband of a wider band luminance signal. The processing circuits serve to convert an input composite signal of buried subcarrier format to an output composite signal of NTSC format, with comb filtering employed to separate the buried subcarrier chrominance signal from midband luminance signal components. To preclude the "jitter" of played back signals from disturbing the accuracy of the comb filter separating action, heterodyning of the recovered buried subcarrier composite signal (or a portion thereof) with local oscillations precedes comb filtering. The source of local oscillations is caused to have substantially the same "jitter" as the recovered signal components, by rendering the local oscillation source responsive to the frequency variations suffered by the color synchronizing component which accompanies the buried subcarrier chrominance signal. The product of heterodyning with such local oscillations is substantially jitter-free; comb filtering of the product may be carried out with crosstalk freedom relatively independent of the original "jitter."

By appropriate choice of the nominal frequency of the local oscillations, the heterodyning step that effects jitter stabilization may also serve to shift the chrominance signal from its midband location in the input (buried subcarrier) format to the highband location desired for the output (e.g., NTSC) format, whereby subsequent comb filtering (in the highband spectral region) to eliminate luminance signal components provides a highband chrominance signal for direct inclusion in an output composite signal.

The present invention is directed to apparatus for effecting the jitter stabilization of the Amery, et al. arrangement in a reliable manner in the face of the frequency deviations and drifts that may be encountered in practical realizations of the player apparatus. Pursuant to the principles of the present invention, the desired stabilization is effected by a phase-locked loop (PLL) system configured in a manner ensuring the ability to reliably achieve and maintain proper locked operation without the need for customer operated controls, while avoiding "sidelock" during start-up, and minimizing chrominance signal disturbances following dropouts.

Illustratively, the local oscillations, with which the input composite signal of buried subcarrier format is heterodyned, vary about a nominal frequency of $f_s+f_s'$, where $f_s'$ is the nominal buried subcarrier frequency of the recorded signal and $f_s$ is the desired output subcarrier frequency. With a desirable choice for the buried subcarrier frequency being 195/2 times the horizontal scanning frequency $f_H$, (i.e., approximately 1.53 MHz, when $f_H$ corresponds to the line scanning frequency of the U.S. color television broadcast standards), while an appropriate choice for the output subcarrier frequency is the NTSC value of 455/2 $f_H$ (approximately 3.58 MHz, for the indicated $f_H$ choice), the sum frequency for the local oscillations with such choices is 325 $f_H$ (corresponding to approximately 5.11 MHz.).

In the absence of jitter of the input composite signal frequencies, the heterodyning of the input composite signal with the $(f_s+f_s')$ oscillations provides a difference frequency product in which chrominance information appears as modulation of a subcarrier at the NTSC value of 3.58 MHz., with the accompanying color synchronizing component appearing as recurring bursts of the 3.58 MHz. subcarrier with a fixed phase and a reference amplitude. By suitably gating the aforesaid difference frequency product of the heterodyning action during the recurring burst intervals, the $f_s$ color synchronizing component may be separated therefrom for phase comparison with the output of a highly stable reference oscillator operating at $f_s$.

In the presence of jitter of the input composite signal frequencies, the phase comparator output provides a control voltage output to be utilized in varying the frequency of the local oscillation source in a direction to minimize subcarrier frequency change in the heterodyne product. A closed loop is thereby completed which may serve to hold the color synchronizing component of the heterodyne product in frequency (and phase) synchronism with the stable reference oscillator output.

In implementing such a phase locked loop system, however, in the setting of a video disc player of the form previously described, a variety of problems must be confronted that arise from the nature of the player operations.

One of the problems that must be confronted is the problem of "sidelock." To appreciate the nature of the sidelock problem, it should be appreciated that the frequency spectrum of the color synchronizing component output of the burst separator in the above-described PLL system includes not only the frequency of the subcarrier but also a plurality of sideband frequencies differing from the subcarrier by integral multiples of $f_H$. Appearing with significantly high energy content are sideband frequencies separated from the subcarrier by $1f_H$.

When the relative stylus-groove velocity is correct, the composite signal recovered upon playback will include a color synchronizing component having a subcarrier component at the desired buried subcarrier frequency $(f_s')$ and high energy content sideband components at frequencies of $f_s'-f_H$ and $f_s'+f_H$. However, when using the above-described type of turntable speed control system, there is a start-up condition when the turntable is rotating at a higher than normal speed and the speed control braking system is just coming into operation. Illustratively, under such conditions, the subcarrier component (and its accompanying sidebands) may be 1% higher in frequency than their desired values. With such a 1% increase, a lower sideband component frequency, normally at $f_s'-f_H$, will be quite close to falling at the $f_s'$ value (and indeed much closer to that frequency value than the subcarrier component itself). Similarly, in the selected heterodyne product, the lower sideband component of the synchronizing signal can be much closer to a frequency value of $f_s$ than the subcarrier component itself. This presents the danger that the phase-locked loop may lock to a lower sideband component of the synchronizing signal rather than to the subcarrier frequency component thereof, and may remain locked to the lower sideband component as the velocity is corrected.

Maintenance of such a condition of locking to a sideband component (i.e., sidelock) is precluded in apparatus embodying the present invention by limiting the control of the $(f_s'+f_s)$ oscillation source to a range of realizable frequency variations of a width which is smaller than the magnitude of frequency change to be experienced by the synchronizing signal sideband component in the transition from initial overspeed condition to the controlled speed condition. Illustratively, where the magnitude of such frequency change to be experienced is approximately 15.3 KHz., voltage limiting means are associated with the phase comparator output of the PLL system to limit the range of frequency variations it may produce to a range of the order of ± 5 KHz. With such an arrangement, one is assured that should the PLL system lock to the sideband component during the start-up overspeed condition, there will be a break-out from the locked condition as speed correction is imposed, since the controlled oscillation source cannot track the large (e.g., 15.3 KHz.) frequency variation that the sideband component undergoes during speed correction attainment.

When the requirements associated with ensuring that an output composite signal applied from the disc player to a commercial color television receiver will have sufficient horizontal sync stability to properly synchronize the receiver's horizontal deflection circuits are met by use of expedients such as the previously described turntable speed control and armstretcher systems, subcarrier frequency variations to be encountered during operation in the speed corrected mode may be expected to be held within the previously mentioned ± 0.1% limits. That is, the long term drift of the buried subcarrier frequency should not cause departure from the desired 1.53 MHz. value by more than ± 1.53 KHz.; and, cyclical variations of the recovered subcarrier frequency (due to such causes as off-centering, record warp, etc.) should not swing the subcarrier more than ± 1.53 KHz. about its average frquency. In the presence of such tight controls, the above-indicated limitation (e.g., ± 5 KHz.) of control range for the controlled oscillation source is feasible, since a tracking range width is provided that will enable a lock-up to the subcarrier component of the synchronizing signal (when attained after speed correction is in force) to be maintained in the face of the residual speed variations permitted by the turntable speed control and armstretcher systems.

The previously described use of control range limits to preclude maintenance of a sidelock condition cannot be relied upon unless the long term drift of the controlled oscillation source can be held within a range of variations appreciably narrower than the control range (e.g., a drift range of order of ± 0.8 KHz.). In the illustrative arrangement where the nominal $f_s' + f_s$ frequency value is approximately 5.11 MHz. such long term stability requirements are of the order of 0.015 %.

In order to meet such difficult stability requirements, apparatus in accordance with the present invention employs a voltage controlled oscillator (VCO) operating at a nominal frequency much lower than the required output frequency of $f_s' + f_s$; illustratively, the nominal VCO operating frequency is chosen to be $(f_s/2) - f_s'$, or approximately 256 KHz. (for the illustrative values of 3.58 MHz and 1.53 MHz for $f_s$ and $f_s'$ respectively). The VCO output is heterodyned with oscillations having a frequency of 3/2 $f_s$ (5.37 MHz), and the difference frequency product, i.e., $3/2\,f_s - (f_s/2 - f_s')$, is selected to provide the desired $f_s + f_s'$ (5.11 MHz.) output. The 3/2 $f_s$ oscillations are derived from the previously mentioned, highly stable reference oscillation source (illustratively, a 3.58 MHz. crystal oscillator) by successive steps of frequency halving the $f_s$ output, and frequency tripling the resultant.

With use of the described arrangement, the drift of the $f_s + f_s'$ oscillation source corresponds to that of the 256 KHz. VCO plus 3/2 times the drift of the 3.58 MHz reference oscillator. Since the latter drift contribution is inconsequential (e.g., ± 40 Hz) with use of crystal control for the 3.58 MHz oscillator, the drift of the 5.11 oscillation source is essentially that of the low frequency 256 KHz oscillator. Limitation of drift to the indicated range (approximately ± 0.8 KHz.) imposes at 256 KHz a stability requirement of 0.03%, which is much less stringent than the previously mentioned stability requirement (0.015%) and is readily attainable with an LC oscillator form for the VCO.

It may further be noted that the particular choice of nominal VCO operating frequency $(f_2/2 - f_s')$ bears no harmonic or subharmonic relationship to the other system frequencies (i.e., $f_s$, $f_s'$ or $f_s + f_s'$), whereby problems of undesired injection locking of the VCO via stray pickup of other system frequencies are readily avoided.

It has further been found that noise considerations indicate the wisdom of restricting the loop bandwidth in the PLL system to a value (e.g., 3.5 KHz.) insufficient to ensure acquisition of phase lock to the subcarrier component under start-up conditions or subsequent to signal dropouts. In apparatus embodying the present invention, pull-in capability is ensured despite use of the indicated narrow loop bandwidth through use of means for sweeping the VCO across a range of frequency variations of adequate width to ensure lock acquisition, the sweep means being activated when an out-of-lock condition is sensed and deactivated when phase lock is acquired.

For sweep control purposes, a second phase detector is provided for phase comparison of 3.58 MHz reference oscillations with separated synchronizing bursts. One of the inputs (e.g., the reference oscillation input) to the second phase detector is phase shifted 90° relative to the comparable input to the VCO-controlling phase detector, so that the second phase detector functions as an in-phase burst detector when phase lock is acquired. An out-of-lock detector, responding to the output of the second phase detector, establishes an activated mode for the sweep circuit when lack of phase lock prevents the second phase detector from developing a DC output of a given threshold level. When acquisition of phase lock permits such DC output development, the out-of-lock detector responds by placing the sweep circuit in a deactivated mode.

The sweep circuit desirably provides a symmetrical triangular waveform, sweeping above and below ground potential with sufficient magnitude that application thereof to the VCO control circuits can effect sweep of the VCO throughout its control range. The sweep rate is chosen to be sufficiently slow (e.g., 5 Hz.) that the out-of-lock detector can respond to phase lock acquisition by stopping the sweep before the loop is swept beyond its tracking range. In accordance with a feature of the present invention, when the sweep circuit is shifted to its deactivated mode, the sweep circuit output does not hold but rather sweeps back to mid-range value (e.g., ground potential); the sweep back is not a step function (which might cause the loop to lose phase lock) but rather occurs with the same slope as is associated with the triangular waveform generation during the activated mode.

Desirably, the output of the VCO controlling phase detector may be applied to a sample-and-hold circuit prior to amplification, limiting and application to the VCO, with the advantage of reducing control voltage decay during line intervals intervening burst appearances. The sample-and-hold circuit also enhances the PLL system's ability to hold within rapid pull-in range during the occurrence of signal dropouts. To aid performance of the function of holding through dropouts, it is desirable that keying pulses for the burst separator and for the sample-and-hold circuit do not appear during the absence of signal. It is also desirable for best operation that such keying pulses do not appear during the equalizing pulse portions of the vertical blanking interval. Noise immune sync separator and gating pulse generator apparatus suitable for providing keying pulses meeting the aforesaid requirements are disclosed, for example, in the U.K. Pat. application Ser. No. 13,263/73, filed Mar. 20, 1973 for Charles D. Boltz, Jr.

To afford sufficient holding time to hold through lengthy dropouts lasting for many line intervals, a convenient arrangement employs the same relatively large-valued capacitor to perform the dual functions of loop lowpass filter capacitor, and holding capacitor of the sample-and-hold circuit.

Figure 2:
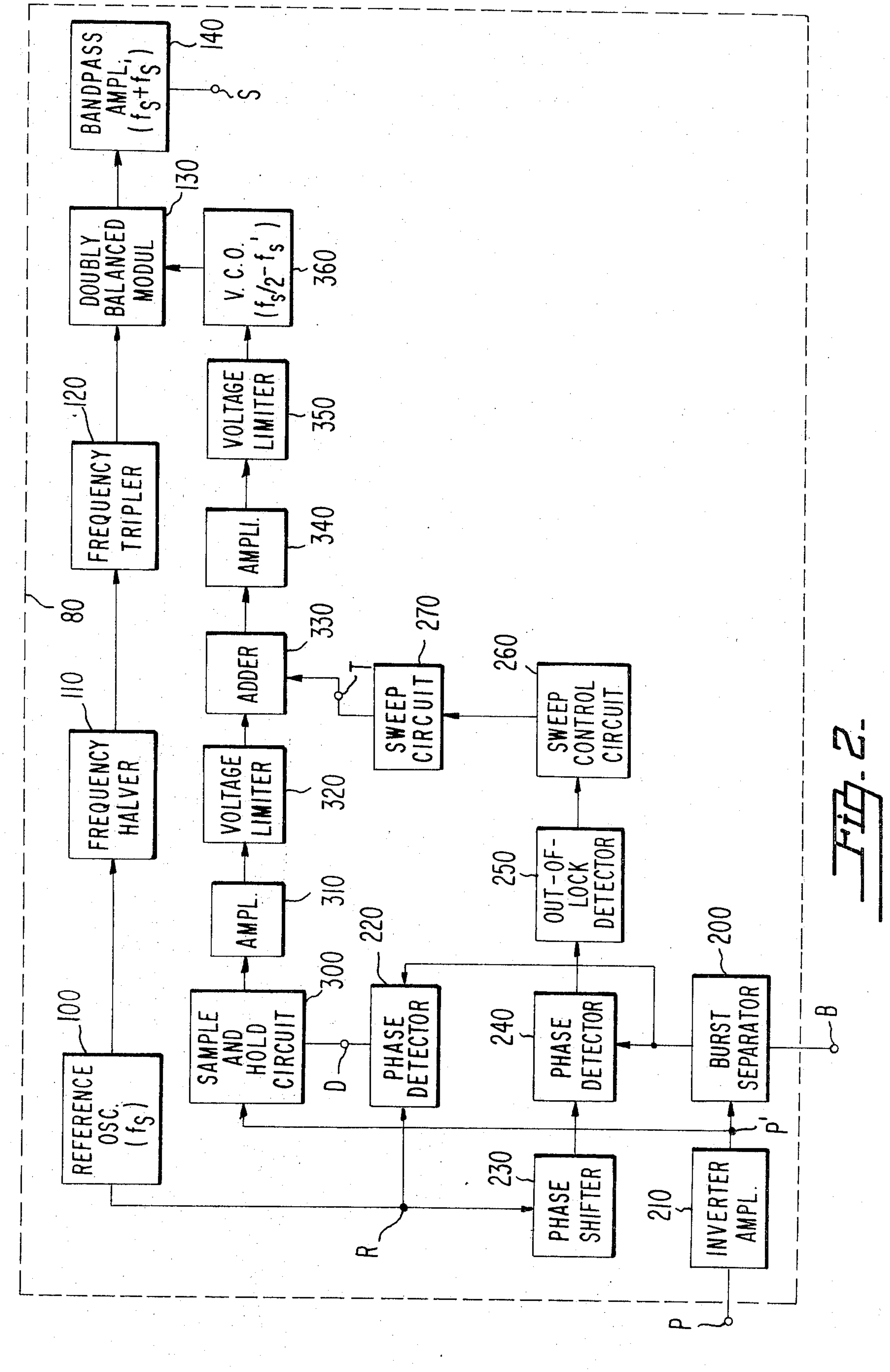
Figure 3:
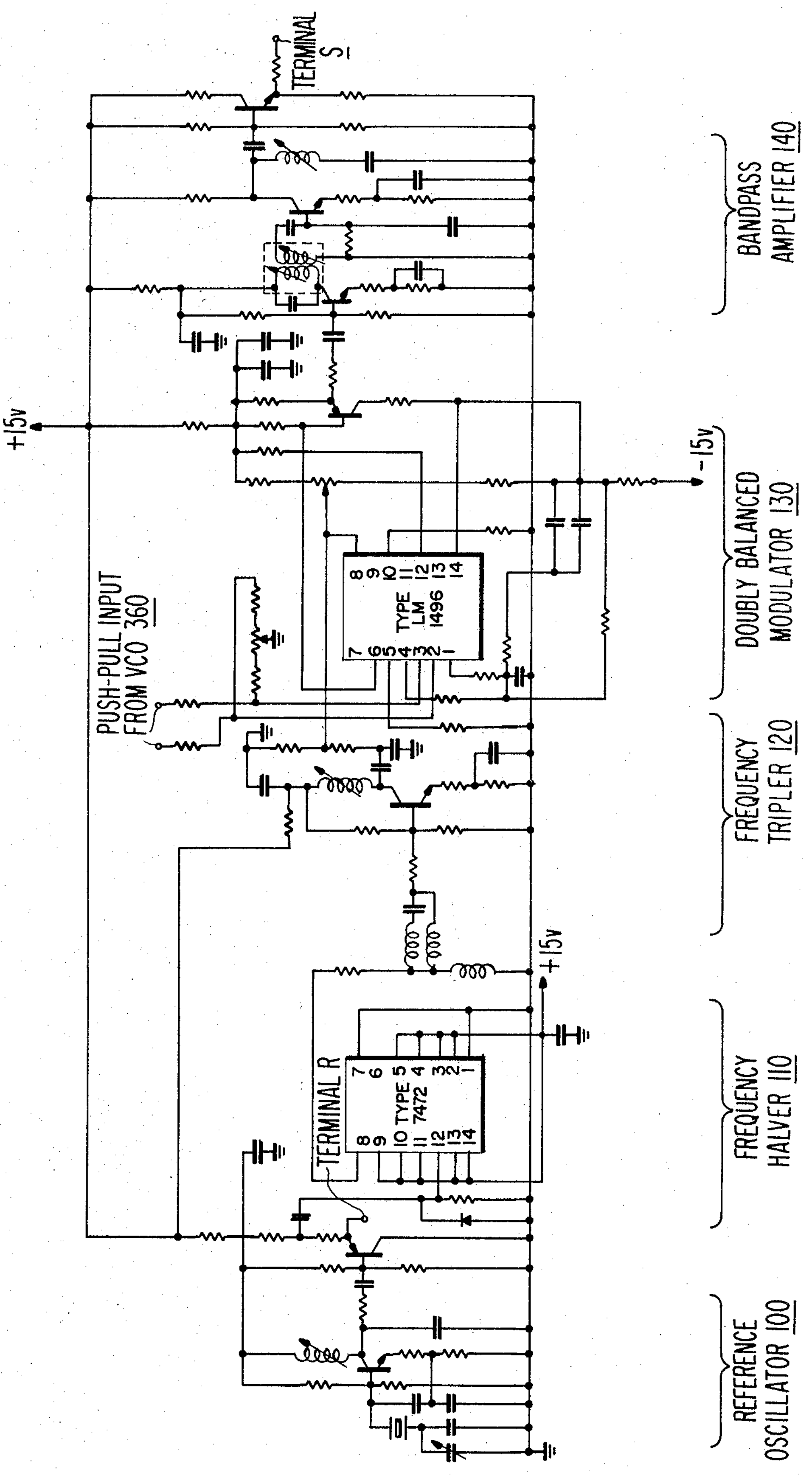
Figure 4:
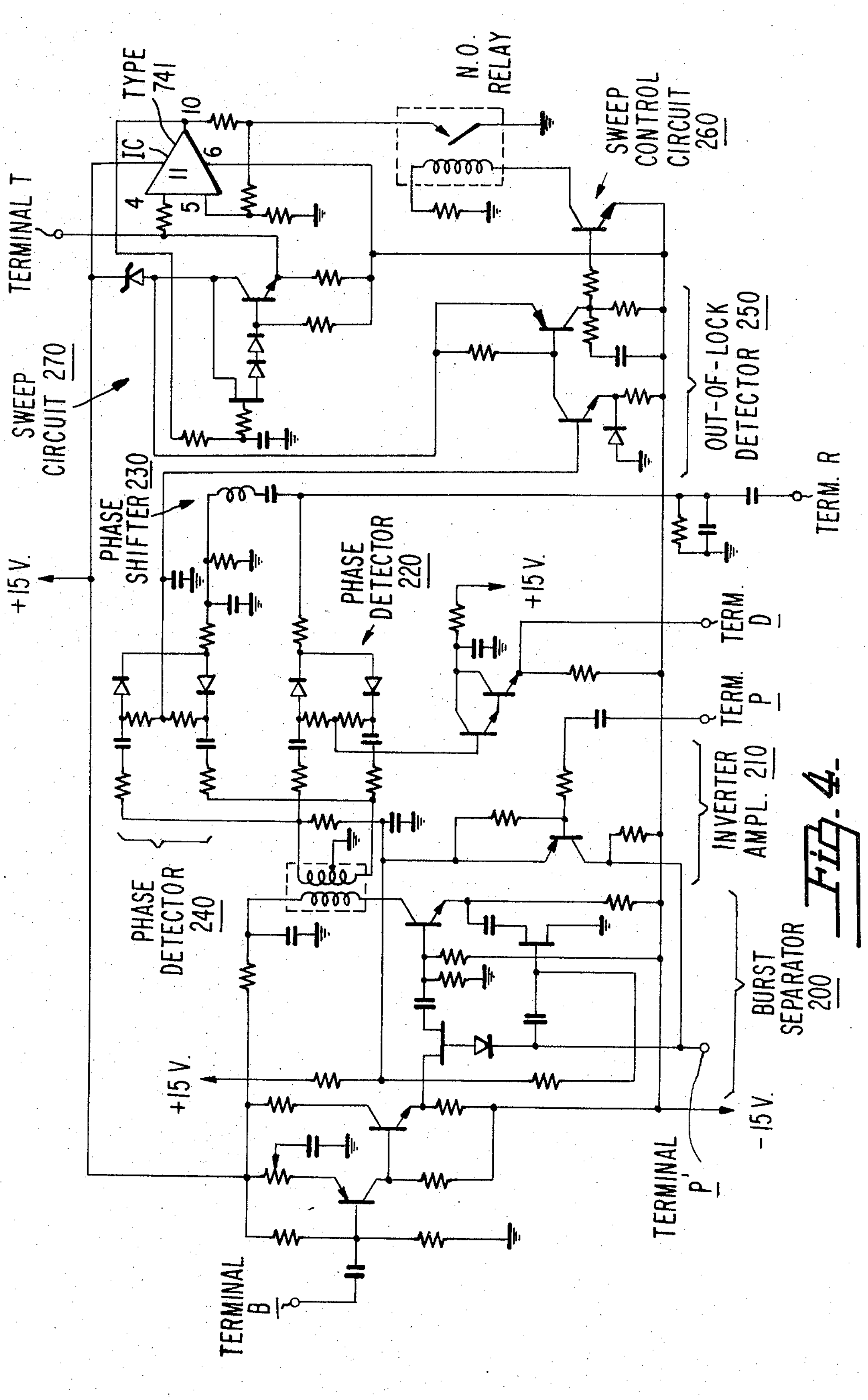
Figure 5:
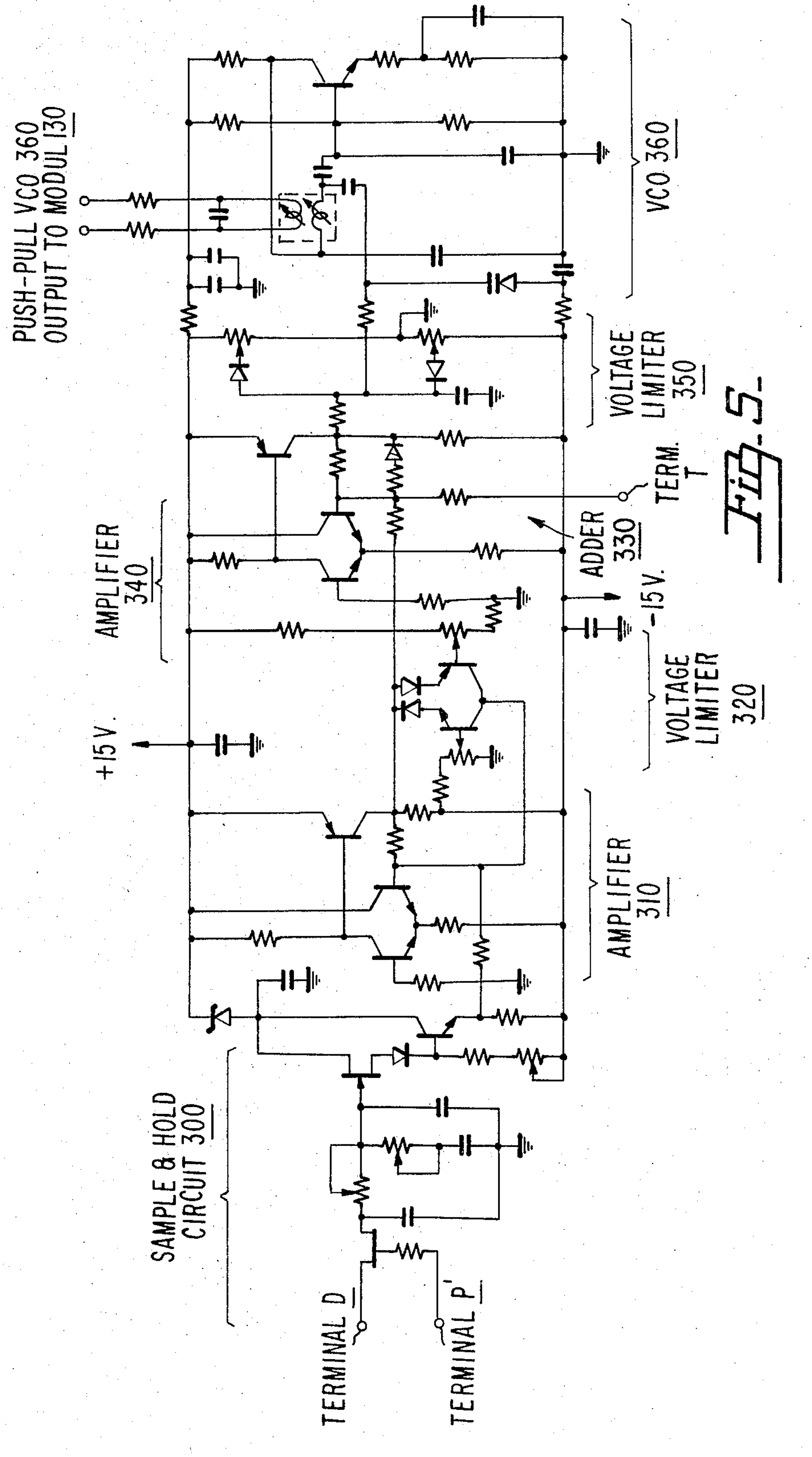

Objects and advantages of the present invention will be recognized by those skilled in the art upon a reading of the following detailed description and an inspection of the accompanying drawings in which:

FIG. 1 illustrates, in block diagram form, a general arrangement for a video disc player in which apparatus embodying the principles of the present invention may be advantageously employed;

FIG. 2 illustrates, in block diagram form, a circuit configuration, pursuant to an embodiment of the present invention, suitable for service as a controlled oscillation source in the player arrangement of FIG. 1; and FIGS. 3, 4 and 5 illustrate in schematic detail specific circuitry which may be employed in respective portions of the FIG. 2 circuit arrangement in accordance with principles of the present invention.

In FIG. 1, a turntable 10 is diagrammatically represented as being rotated by a turntable drive motor 12 suitably mechanically coupled thereto. A video disc record 14 is supported on the turntable 10 for rotation therewith, and receives in a spiral groove on its surface a stylus 16 (diagrammatically represented) which is electrically coupled to pickup circuits 20.

The disc 14, stylus 16, and pickup circuits 20 are, illustratively, of the general form disclosed in the aforesaid Clemens application, whereby, as the disc is rotated, capacitance variations occur in accordance with information recorded as geometry variations in the groove bottom, the capacitance variations alter the response of a resonant circuit (incorporating the varying capacitance) to an injected RF signal, and the resultant amplitude variations of the RF signal are detected to recover the recorded information. A specific form which the pickup circuits 20 may advantageously take is disclosed, for example, in U.K. Pat. application Ser. No. 14,395/73, filed Mar. 26, 1973.

The information recorded in the groove bottom of the video disc 14 desirably is in the form of a carrier frequency modulated in accordance with a composite color television signal. The frequency modulated carrier wave output of pickuip circuits 20 accordingly is applied to an FM demodulator 30 to develop at the demodulator output terminal Va composite color television signal output.

Sync separator apparatus 40, coupled to terminal V, serves to separate deflection synchronizing components of the composite signal from the picture components thereof, and to develop a plurality of pulse train outputs in response to the separated synchronizing components. One pulse train output of sync separator 40, which comprises pulses recurring at the line rate ($f_H$) when the relative stylus-groove velocity is correct, is applied to a speed error detector 51 (which cooperates with a brake drive circuit 53 and an eddy current brake 55, in a manner to be subsequently described, to form a turntable speed control system of the form disclosed in the previously mentioned Beyers application). Another output of sync separator 40, also comprising pulses recurring at the line rate ($f_H$) when the relative stylus-groove velocity is correct, is applied to a discriminator 61 (which cooperates with an amplifier 63 and an armstretcher transducer 65 to provide, in a manner to be subsequently described, an armstretcher system of the general form disclosed in the aforesaid Palmer patent). Another output of sync separator 40 is applied to a burst gating pulse generator 90, which provides a train of keying pulses at its output terminal P.

Desirably, sync separator 40 is highly noise immune and not subject to providing pulse outputs under signal dropout conditions. It is also desirable that keying pulses not appear at terminal P during the vertical blanking interval, including the equalizing pulse portions thereof. To these ends, the functions of sync separation and burst gating pulse generation may advantageously be performed in the manner described in the aforesaid Boltz application.

The speed error detector 51 monitors the spacing between successive pulses in the output of sync separator 40, as, for example, by comparing the input and output of a 1H delay line to which the pulse train is fed, to determine departures from correct spacing as an indication of departure of the stylus-groove velocity from the desired relative velocity. The output of speed error detector 51 controls the energization of the eddy current brake 55 by means of a brake drive circuit 53. The eddy current brake 55 cooperates with the conductive turntable 10 to controllably retard the turntable rotation relative to its free-running speed (which is set slightly higher, e.g., 1%, than desired for normal signal playback), responding to changes in the speed error detector output in a compensating sense. The controllable braking system primarily corrects long term variations in the relative stylus-groove velocity to hold the average velocity correct within close tolerances (e.g., within 0.1% as previously mentioned). In a typical turn-on sequence, the turntable drive motor 12 brings the turntable up to its free-running speed prior to stylus touch-down in the disc groove. After stylus touch-down, pulses fed to the speed error detector 51 provide a correcting energization of the eddy current brake 55, slowing the turntable 10 to bring the stylus-groove velocity toward its correct value.

Practical tolerances with respect to the accuracy of the disc center-hole location relative to the convolutions of the spiral groove of the disc 14 result in the likelihood of some slight degree of off-centering, with the consequence of a cyclical variation in the relative stylus groove velocity at the "once-around" frequency. With a video disc rotation rate of 450 rmp. having proved to be desirable, the associated "once-around" frequency is 7.5 Hz. Record warp conditions typically encountered also result in cyclical velocity variations at the once-around frequency, as well as several harmonics thereof (e.g., 15 Hz. and 30 Hz.). Because of the relatively large mass of the turntable, it is difficult to adequately correct cyclical velocity variations at these frequencies via a turntable speed control system. Instead, it has proved desirable to correct these cyclical variations by varying the position of the relatively light mass stylus along the groove in a variation opposing manner. For this purpose, discriminator 61 senses the cyclical variations in the frequency of the pulses supplied from sync separator 40, developing a control voltage output for application via amplifier 63 to an armstretcher transducer 65. The armstretcher transducer 65 is mechanically coupled to the stylus 16 in a manner to produce motion of the stylus 16 in a longitudinal direction relative to the disc groove with an amplitude and sense appropriate for reducing the undesired variation in relative velocity. As previously indicated, proper operation of such an armstretcher system can reduce the cyclical velocity variations to a residual variation range of ± 0.1% about the correct velocity value.

In the player arrangement of FIG. 1, the composite color television signal appearing at the FM demodulator output terminal V is applied to a processing circuit 70 for conversion of the composite signal from its recorded format to an output format suitable for application to a color television receiver. The particular arrangement illustrated for the components of the processing circuit 70 conforms to an arrangement disclosed in the aforesaid Amery, et al., application, serving to convert a composite signal recorded in a "buried subcarrier" format to an output composite signal in a format generally identifiable as an NTSC format.

The composite signal appearing at terminal V, including chrominance information in the form of sidebands (illustratively, ± 500 KHz.) of a buried subcarrier $f_s'$ (illustratively, at the aforementioned frequency of 195/2 $f_H$, or approximately 1.53 MHz.) is applied to a singly balanced modulator 71, along with oscillations from the output terminal S of a stabilizing oscillation source 80 at a nominal frequency of $f_s' + f_s$ (where $f_s$ is the color subcarrier frequency desired for the output composite signal). The sum frequency ($f_s' + f_s$) corresponds to 325 $f_h$, or approximately 5.11 MHz., when $f_s'$ is at the aforesaid 195/2 $f_H$ value, and $f_s$ is at the NTSC value of 455/2 $f_H$ (or approximately 3.58 MHz.). The modulator 71 is balanced for the composite signal input from terminal V, but not for the input from oscillation source 80.

A vestigial sideband (VSB) filter 72 coupled to the modulator 71 selectively passes a modulated carrier output, including a carrier component nominally at the $f_s' + f_s$ value, a lower sideband component (corresponding to a difference frequency product of modulation) in which the chrominance signal appears as sidebands of a subcarrier at a frequency corresponding to $f_s$, and a vestige of an upper sideband component. The output of filter 72 is applied to the input of a bandpass filter 73, having a passband centered about the translated subcarrier frequency ($f_s$) and a bandwidth corresponding to the chrominance signal bandwidth (e.g., ± 500 KHz.).

An output of bandpass filter 73 is applied to a comb filter formed by the combination of a 1H delay line 74 (providing a delay of $1/f_H$), and a combiner 75 for subtractively combining the delay line input and output. The chrominance comb filter thus formed has multiple pass bands centered about odd multiples of half the line frequency ($f_H$), and interleaved nulls at integral multiples of the line frequency. The function of the chrominance comb filter is to pass to its output terminal C the chrominance signal component of the frequency translated composite signal to the substantial exclusion of liminance signal components sharing the band about $f_s$. The combed chrominance signal component appearing at terminal C is applied, along with an uncombed version of the frequency translated composite signal (appearing at the output of VSB filter 72), to limunance comb filter apparatus 76.

The luminance comb filter apparatus 76, disclosed in greater detail in the aforesaid Amery, et al., application, may, illustratively, include a combiner for subtractively combining the two composite signal outputs substantially free of chrominance signal components. By also including an envelope detector responsive to the combiner output and a low pass filter for the detector output, the combed luminance signal may be retranslated to its normal baseband range, and appear in this form at the luminance comb filter output terminal L.

The processing circuit 70 further includes a combiner 77 for additively combining the combed luminance signal at terminal L with the combed (and frequency translated) chrominance signal at terminal C to form an output composite signal (of a form suitable for application to an NTSC-type color television receiver) at output terminal O.

It will be appreciated that spurious variations of the frequencies of the input composite signal at terminal V can disturb the accuracy of the chrominance-luminance signal separation effected by the comb filters of the processing circuit 70. To avoid this disturbance, it is desired that the frequency of oscillations from source 80 similarly vary, whereby the difference frequency product of modulation forming the frequency translated chrominance signal may be substantially free of the spurious variations. For this purpose, an output of bandpass filter 73, appearing at terminal B, is applied to oscillation source 80, along with burst keying pulses from the output terminal P of the burst gating pulse generator 90, in order to form a closed loop control system of a phase locked loop (PLL) form.

It is now in order to consider the nature of oscillation source 80 and its manner of response to the indicated inputs to achieve the desired result of frequency stabilization of the chrominance signal component to be supplied to output terminal O. For this purpose, attention is directed to FIG. 2, which illustrates an arrangement of components for oscillation source 80 pursuant to an embodiment of the present invention.

In the FIG. 2 arrangement, the oscillation source 80 is illustrated as including a reference oscillator 100 operating at the desired otuput subcarrier frequency $f_s$ (e.g., 3.58 MHz.); desirably, the reference oscillator 100 is highly stable in frequency, and, illustratively, is crystal controlled for this purpose. An output of reference oscillator 100 is applied to a frequency halver 110, in turn supplying a $\frac{1}{2} f_s$ output to a frequency tripler 120. The output of frequency tripler 120 (at frequency of $3/2\, f_s$) is applied as an input to a doubly balanced modulator 130; also applied as another input to modulator 130 is the output of a voltage controlled oscillator (VCO) 360 at a nominal frequency of $\frac{1}{2} f_s - f_s'$ (e.g., 256 KHz.). A bandpass amplifier 140, coupled to the output of modulator 130 selects the difference frequency product of modulation, nominally falling at a frequency of $f_s + f_s'$, and supplies this product to the output terminal S of the oscillation source 80.

Thus, under nominal operating conditions, and in the absence of error voltage shift of the frequency of VCO 360, the output supplied to terminal S is at the nominally desired frequency of $f_s + f_s'$ (e.g., 5.11 MHz.). Such a frequency will ensure translation of the buried subcarrier of the input composite signal (by modulator 71 of FIG. 1) to the desired output subcarrier frequency of $f_s$, unless the input composite signal is suffering a spurious variation of its frequencies. The latter instance will be reflected by an alteration of the frequency and phase of the color synchronizing component of the frequency translated chrominance signal, otherwise appearing at terminal B as a burst of $f_s$ oscillations of fixed phase and reference amplitude during recurring "backporch" portions of the horizontal blanking intervals.

In order to monitor the condition of the burst component, the signal at terminal B is applied to a burst separator 200, subject to keying by pulses appearing at a terminal P', and supplied via an inverter amplifier 210 in response to the keying pulse train available at the previously mentioned keying pulse terminal P. The separated burst component output of separator 200 is applied to a phase detector 220, also responding to an $f_s$ output of the reference oscillator 100 delivered to reference terminal R.

The error voltage appearing at output terminal D of detector 220 is sampled during each interval of burst appearance, and the sampled level held throughout the succeeding line interval by the action of a sample-and-hold circuit 300, subject to the keying action of pulses from terminal P'. The output of the sample-and-hold circuit 300 is supplied to a DC voltage amplifier 310, and the amplified error voltage output of the latter is applied via a (bidirectional) voltage limiter 320 to an adder 330. The voltage limiter 320 precludes an error voltage input to adder 330 of either polarity from exceeding predetermined limits.

Adder 330 functions to add to the error voltage input a sweep voltage, whenever the latter appears at the output terminal T of a sweep circuit 270 the control of which will be subsequently described). The output of adder 330 is applied to an additional DC voltage amplifier 340, and the amplified voltage output of amplifier 340, subject to the bidirectional voltage limiter 350, serves as the control voltage input for shifting the frequency of VCO 360 when requisite.

For sweep circuit control purposes, a second phase detector 240 is provided. Phase detector 240 responds to the same output of burst separator 200 as phase detector 220; however, the $f_s$ oscillation input to detector 240 is in quadrature with the $f_s$ oscillation input to detector 220, since the terminal R input to the latter detector is subjected to a 90° phase shift in phase shifter 230 prior to application to phase detector 240.

When the described PLL system achieves a lock, a quadrative relationship is maintained between the burst and reference inputs to phase detector 220. Under such circumstances, a co-phasal relationship exists between the burst and reference inputs to phase detector 240, permitting build-up of a DC output voltage to which an out-of-lock detector 250 responds by causing a sweep control circuit 260 to disable sweep circuit 270. In contrast, in the absence of lock attainment, as sensed by out-of-lock detector in monitoring the output of phase detector 240, sweep control circuit 260 is caused to enable sweep circuit 270, which supplies a triangular waveform to adder 330.

In the FIG. 2 arrangement, the provision of voltage limiters in the error signal path to VCO 360 serves the previously mentioned invention purpose of limiting the range of frequency variations for VCO 360 to preclude "sidelock" maintenance. Illustratively, voltage limiter 350 limits the control voltage input to VCO 360 to a range of voltages that can effect only a ± 5 KHz. shift of the VCO output frequency. This ensures that should the PLL system lock to a sideband component of the color synchronizing signal during a start-up uncorrected overspeed condition, breakout from the locked condition will occur as speed correction is imposed, since VCO 360 cannot track the 1% frequency variation (e.g., 15.3 KHz.) that the sideband component undergoes as speed correction takes effect.

The pre-adder voltage limiter 320 serves to set limits for the error voltage contribution to the control voltage, so that the former alone can at most, upon amplification, just reach the limiting levels set by limiter 350. With such a limitation to the error voltage amplitude to provide sweep voltage limits of twice the levels of the error voltage contribution assures the ability of the sweep circuit 270 (when enabled) to sweep VCO 360 over the full variation range without regard to the level of the error voltage contribution.

It will be observed that in the FIG. 2 arrangement, the VCO 360 of the PLL system operates at a much lower nominal frequency (e.g., $\frac{1}{2}f_s - f_s'$, or 256 KHz.) than the nominal output frequency (e.g., $f_s + f_s'$, or 5.11 MHz.) required from source 80. An output of the requisite frequency is obtained by heterodyning the VCO output with oscillatins that are near to the required output frequency and are derived from the output of the highly stable reference oscillator 100. With this technique, a reasonable frequency stability requirement of ± 0.3% for the VCO results in a total frequency drift for the 5.11 oscillation source that is small (e.g., of the order of ± 0.8 KHz) relative to the limited hold-in range permitted for the VCO, In contrast, a VCO operating at the output frequency with frequency stability of the order of 0.3% would be unusable, as it would be subject to a frequency drift that exceeded the limiited hold-in range permitted for the VCO.

The frequency value $\frac{1}{2}f_s - f_s'$ for the low operating frequency of VCO 360 is illustrative of a desirable choice therefor, in that it is not harmonically related to the other system frequencies of $f_s$, $f_s'$ and $f_s + f_s'$, so that undesired injection locking of VCO 360 via stray pickup of such other system frequency signals is not a problem.

The provision of sweep circuit 270 for lock acquisition permits narrowing of the loop bandwidth of the PLL system to less than the required pull-in range (e.g., to 3.5 KHz.) to enhance noise immunity. The sweep rate is chosen to be sufficiently slow (e.g., 0.5Hz.) so that a response to lock acquisition by components 240, 250, 260 will achieve disabling of sweep circuit 270 before the loop is swept beyond its tracking range. When sweep circuit 270 is disabled, the sweep circuit output does not hold at the level reached at the time of disabling but rather sweeps back to mid-range value, the sweep back ocurring with the same slope as is associated with sweep voltage generation during its enabled condition. Removal of the sweep voltage contribution in this fashion avoids the danger of phase lock loss accompanying a sudden collapse of the sweep waveform.

The inclusion of sample-and-hold circuit 300 in the error voltage development circuitry improves performance subsequent to the occurrence of a signal dropout, by permitting the system to hold within rapid pull-in range during lengthy signal dropouts. This is particularly so where, as previously described, one can reasonably assure disappearance of keying pulses at terminal P during the signal dropout occurrence.

FIGS. 3, 4 and 5 illustrate in schematic detail specific circuitry for implementing respective portions of the arrangement of FIG. 2 pursuant to a particular operating embodiment of the present invention. FIG. 3 shows particular circuitry for the components 100, 110, 120, 130 and 140 (comprising the upper tier of blocks in the FIG. 2 block diagram), FIG. 5 shows particular circuitry for the components 300, 310, 320, 330, 340, 350 and 360 (comprising the next lower tier of blocks in the FIG. 2 block diagram), while FIG. 4 shows particular circuitry for the components 200, 210, 220, 230, 240, 250, 260 and 270 (comprising the remaining blocks in the FIG. 2 block diagram).

In FIG. 3, a crystal controlled oscillator of conventional configuration serves as the highly stable reference oscillator 100, developing oscillations at the NTSC frequency value of 3.58 MHz. The oscillator output is applied via an emitter follower to reference output terminal R, and additionally to trigger a flip-flop circuit, employing a type 7472 integrated circuit, and serving as the frequency halfer 110. The square wave output of the flip-flop circuit is supplied via a frequency selective coupling (low impedance at the third harmonic of the square wave frequency, and high impedance at the fundamental) to an amplifier, having a tuned collector load, resonant at the desired third harmonic. The amplifier, with its tuned input coupling and tuned output circuit, serves as the frequency tripler 120. A balanced modulator chip, illustratively of the LM 1496 type, receives a push-pull input from the VCO 360 and a single-ended input from tripler 120, and serves as the balanced modulator 130. The modulator output is coupled via an emitter follower to a two-stage bandpass amplifier, serving as amplifier 140 and employing resonant circuits tuned to the desired 5.11 MHz. difference frequency. A series resonant circuit in the output circuit of the second stage to provide a trap for the undesired sum frequency (5.63 MHz.). An output emitter follower couples the output of amplifier 140 to the oscillation source output terminal S.

In FIG. 4, the frequency translated chrominance signal appearing at terminal B is coupled, via successive common-emitter and common-collector transistor amplifier stages, to a coupling path which includes as a series element the drain-source path of a field-effect transistor (FET); the latter passes signals to the base of a succeeding junction transistor stage only when its gate is keyed into conduction by keying pulses from terminal P', at the collector of an inverter amplifier stage (210) responding to the pulse input at terminal P. Also responding to the keying pulses from terminal P' is a second FET, shunting a resistor in the emitter circuit of the junction transistor receiving at its base the signals passed by the first FET. The two keyed FET units serve with the associated junction transistor as a burst separator 200, in which keying transients are at least partially cancelled. The burst separator output is transformer coupled as a push-pull input to a pair of balanced diode phase detectors (detectors 220 and 240). A reference input is applied to both detectors from reference terminal R, with reactive network interposed in the coupling to detector 240 (to serve as quadrative phase shifter 230).

A pair of complementary junction transistors in cascade develop a control voltage output across a time constant circuit under in-lock conditions, as reflected in the output of detector 240 (and effectively serve as the out-of-lock detector 250). A third stage in cascade energizes a relay under such in-lock conditions (and effectively serves as the sweep control circuit 260). When the controlled relay is closed, a sweep circuit 270, which employs an operational amplifier IC of type 741, illustratively, is effectively disabled. The sweep oscillator uses the basic principles of a well-known operational amplifier square wave oscillator, altered to extract a triangular sweep waveform output. A source-follower, emitter-followr pair permit sweep waveform takeoff (to terminal T) without loading the RC frequency determining elements. The switch element of the relay and the associated resistive elements allow switching between a recurring sweep waveform output and a ramp back to zero volts without switching transients in the sweep output waveform.

In FIG. 5, the output from phase detector 220, appearing at terminal D passes via the drain-source path of an FET, keyed by pulses from terminal P' to a holding capacitor (the network serving as the sample-and-hold circuit and loop low pass filter). A source-follower, emitter-follower pair couples the signal on the holding capacitor to an operational amplifier serving as amplifier 310. Respective diode-transistor paths shunt the feedback resistor of the operational amplifier when settable limits are exceeded (to provide the function of the bidirectional limiter 320). A resistive adding network couples the limited output of amplifier 310, and the sweep input from terminal T to a second operational amplifier 340. A simple clamping diode pair is associated with the output of amplifier 340 to provide the function of voltage limiter 350. The limited output of amplifier 340 controls the bias on a varicap diode in the frequency determining circuit of an LC oscillator, which serves as VCO 360.

What is claimed is:

1. In a video disc player including (a) video disc playback apparatus for developing a composite color television signal including a chrominance signal component occupying a first band of frequencies and comprising sidebands of a color subcarrier at a nominal frequency of $f_s'$ and an accompanying color synchronizing component comprising recurring bursts of oscillations at said nominal frequency of $f_s'$ said components however being subject to spurious frequency variations; and (b) means for deriving from said developed composite color television signal a chrominance signal component occupying a second band of frequencies, separate from and higher than said first band, and comprising sidebands of a color subcarrier at a nominal frequency of $f_s$ and an accompanying color synchronizing component comprising recurring bursts of oscillations at said nominal frequency of $f_s'$ said deriving means including a modulator responsive to the composite signal developed by said playback apparatus and to additional oscillations; apparatus for rendering the frequencies of said derived signal components substantially independent of said spurious frequency variations, comprising the combination of:

a crystal controlled oscillator operating at the frequency $f_s$;

a voltage controlled oscillator having a nominal operating frequency appreciably less than either $f_s$ or $f_s'$, but subject to variation within a third frequency band, separate from and lower than said first band, in accordance with a control voltage input;

phase detector means responsive to the output of said crystal controlled oscillator and to the color synchronizing component of said derived signal;

means for deriving said control voltage input from said phase detector means;

means for effectively frequency multiplying the output of said crystal controlled oscillator;

means for heterodyning the output of said frequency multiplying means with the output of said voltage controlled oscillator;

and means for utilizing the output of said heterodyning means as said additional oscillations to which said modulator is responsive.

2. Apparatus in accordance with claim 1 wherein the spurious frequency variations to which said developed components are subject are of a first magnitude under uncorrected turn-on conditions and a second, lesser magnitude under subsequent corrected playing conditions, and wherein the variation range for said voltage controlled oscillator is limited to a magnitude intermediate said first and second magnitude.

3. Apparatus in accordance with claim 1 wherein the nominal operating frequency of said voltage controlled oscillator is substantially equal to $\frac{1}{2} f_s - f_s'$.

4. Apparatus in accordance with claim 3 wherein said frequency multiplying means provides an output substantially equal to 3/2 $f_s$.

5. Apparatus in accordance with claim 4 wherein the output of said heterodyning means varies about a frequency substantially equal to $f_s + f_s'$ in synchronism with said spurious frequency variations of said developed components.

6. In a video disc player including (a) video disc playback apparatus for developing a composite color television signal having a nominal line frequency $f_H$ and including a chrominance signal component occupying a first band of frequencies and comprising sidebands of a color subcarrier at a nominal frequency of $f_s$, and an accompanying color synchronizing component comprising recurring bursts of oscillations at said nominal frequency of $f_s$, said components however being subject to spurious frequency variations; and (b) means for deriving from said developed composite color television signal a chrominance signal component occupying a second band of frequencies, higher than said first band, and comprising sidebands of a color subcarrier at a nominal frequency of $f_s$ and an accompanying color synchronizing component comprising recurring bursts of oscillations at said nominal frequency of $f_s$, said deriving means including a modulator responsive to the composite signal developed by said playback apparatus and to additional oscillations; apparatus for rendering the frequencies of said derived signal components substantially independent of said spurious frequency variations, comprising the combination of:

a crystal controlled oscillator operating at the frequency $f_s$;

means for generating said additional oscillations, said generating means including a voltage controlled oscillator having an output frequency subject to variation in accordance with a control voltage input;

phase detector means responsive to the output of said crystal controlled oscillator and to the color synchronizing component of said derived signal for developing a control voltage indicative of frequency variations of said color synchronizing component of said derived signal;

amplitude limiting means, responsive to the control voltage developed by said phase detector means, for developing a limited control voltage, restricted to amplitude variations within a selected amplitude range; and means for supplying said limited control voltage to said voltage controlled oscillator as said control voltage input;

wherein said selected amplitude range is such that said variations of the output frequency of said voltage controlled oscillator are restricted to a range of frequencies of a width which is less than said nominal line frequency $f_H$.

7. Apparatus in accordance wwith claim 6 wherein said range of frequencies lies in a third band of frequencies, lower than said first band; and wherein said oscillation generating means also includes:

frequency multiplying means responsive to the output of said crystal controlled oscillator;

means for heterodyning the output of said frequency multiplying means with the output of said voltage controlled oscillator; and means for selecting an output of said heterodyning means for application to said modulator as said additional oscillations.

8. Apparatus in accordance with claim 6 also including:

means for generating a triangular voltage waveform;

second phase detector means responsive to the output of said crystal controlled oscillator and to the color synchronizing component of said derived signal for developing an error signal;

means for controlling the activation and deactivation of said triangular voltage waveform generating means in dependence upon the amplitude of the DC component, if any, of said error signal; and means for coupling the output of said triangular voltage waveform generating means to the input of said amplitude limiting means.

* * * * *